UNITED STATES PATENT OFFICE.

OSCAR GROS, OF LEIPZIG, GERMANY.

PREPARATION IMPERMEABLE FOR ROENTGEN RAYS.

970,215. Specification of Letters Patent. Patented Sept. 13, 1910.

No Drawing. Application filed June 29, 1910. Serial No. 569,556.

*To all whom it may concern:*

Be it known that I, OSCAR GROS, a subject of the German Emperor and resident of Leipzig, in the Kingdom of Saxony, German Empire, have invented new and useful Improvements in Preparations Impermeable for Roentgen Rays, of which the following is a full, clear, and exact specification.

As is well known certain compounds impermeable for Roentgen rays, such as bismuth and thorium preparations, are used for filling cavities of the body in order to make the same accessible for the examination with Roentgen rays. In many cases large quantities are required for this purpose. A measure very often resorted to for avoiding the use of excessively large quantities of the pure materials consists in mixing the compounds with other indifferent preparations insoluble in water and diluted acids, such as white bolus. Mixtures of this kind, however, do not yield uniform images by reason of the fact that the efficient compounds are not quite uniformly distributed in the bolus, and more especially for the reason that, when suspending the mixtures in water to enable them to be taken by the persons to be examined, disintegration of the components will very often take place in consequence of the differences in the specific gravities of the components. I have found that it is possible to avoid these difficulties by coating the substance used as the diluting agent with the compounds impermeable for the Roentgen rays. This coating can be effected by evaporating a solution of a suitable salt, for instance a bismuth salt, such as subnitrate of bismuth, in acidulated water in the presence of the said diluting agent, for instance a silica compound, such as white bolus or kieselguhr, and then rendering the said salt insoluble by calcination, or by precipitating such salt from its solution in the presence of such diluting agent by means of a suitable substance such as soda-lye and then calcinating, the corresponding oxids being thus deposited on the indifferent substances. In this manner I obtain the substance not readily permeable for the Roentgen rays in a state of fine and even subdivision, but remaining nevertheless impermeable for Roentgen rays and capable of producing a very uniform shading on the plate.

When manufacturing such preparations I proceed for instance as follows: I dissolve 10 grams of subnitrate of bismuth in diluted nitric acid and then add to the solution 100 grams of white bolus. I then evaporate the mixture to dryness and subject it to calcination until no nitrogen oxids escape any more. When using in this example only such a quantity of nitric acid as will be sufficient for dissolving the subnitrate of bismuth a partial precipitation of the bismuth salt will already result from the addition of white bolus alone. Instead of nitrate of bismuth I may also employ nitrate of thorium, and instead of white bolus I may employ kieselguhr.

Preparations such as above described will be found to contain the bismuth and thorium in a shape in which it is insoluble and non-capable of being resorbed, and they will yield an intense and uniform shading on the Roentgen plate.

What I claim is:—

1. The hereindescribed composition of matter impermeable to Roentgen rays, consisting of a comminuted substance indifferent to animal fluids, said substance being coated with a metal compound impermeable to Roentgen rays.

2. The hereindescribed composition of matter impermeable to Roentgen rays, consisting of a comminuted silica compound insoluble in water and diluted acids, said substance being coated with a metal compound impermeable to Roentgen rays.

3. The herein described preparations impermeable for Roentgen rays, consisting of white bolus coated with a metal compound impermeable for Roentgen rays.

4. The herein described preparations impermeable for Roentgen rays, consisting of white bolus coated with bismuth oxids.

In testimony, that I claim the foregoing as my invention, I have signed my name in presence of two subscribing witnesses.

OSCAR GROS.

Witnesses:
 ALBERT R. MORAWETZ,
 RUDOLPH FRICKE.